United States Patent
Poscher et al.

(10) Patent No.: US 12,047,782 B2
(45) Date of Patent: Jul. 23, 2024

(54) METHOD OF AND A NETWORK CONTROL FUNCTION FOR ADAPTIVELY ALLOCATING RADIO RESOURCES, AN ADVANCED ANTENNA SYSTEM, AND RADIO CELL SITE EQUIPMENT

(71) Applicant: Telefonaktiebolaget LM Ericsson (publ), Stockholm (SE)

(72) Inventors: Jens Poscher, Aachen (DE); Stefan Eichinger, Pulheim (DE); Ralph Detke, Herzogenrath (DE); Pedro Tercero, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 136 days.

(21) Appl. No.: 17/778,952

(22) PCT Filed: Nov. 29, 2019

(86) PCT No.: PCT/EP2019/083054
§ 371 (c)(1),
(2) Date: May 23, 2022

(87) PCT Pub. No.: WO2021/104640
PCT Pub. Date: Jun. 3, 2021

(65) Prior Publication Data
US 2022/0417759 A1    Dec. 29, 2022

(51) Int. Cl.
*H04W 16/10* (2009.01)
*H04W 16/28* (2009.01)
*H04W 28/16* (2009.01)

(52) U.S. Cl.
CPC ......... *H04W 16/10* (2013.01); *H04W 16/28* (2013.01); *H04W 28/16* (2013.01)

(58) Field of Classification Search
CPC ..... H04W 28/16; H04W 16/10; H04W 16/28; H04W 48/18; H04W 28/0268; H04L 41/5025; H04L 41/5051
See application file for complete search history.

(56) References Cited

U.S. PATENT DOCUMENTS

| | | | | |
|---|---|---|---|---|
| 2002/0058477 | A1* | 5/2002 | Chapelle | H04B 7/18506 455/431 |
| 2002/0181629 | A1* | 12/2002 | Shibata | H04B 7/086 375/347 |

FOREIGN PATENT DOCUMENTS

| | | |
|---|---|---|
| WO | 2018144761 A1 | 8/2018 |
| WO | 2019030425 A1 | 2/2019 |

(Continued)

OTHER PUBLICATIONS

International Search Report and Written Opinion dated Aug. 5, 2020 for International Application No. PCT/EP2019/083054 filed Nov. 29, 2019, consisting of 15-pages.

(Continued)

*Primary Examiner* — Anez C Ebrahim
(74) *Attorney, Agent, or Firm* — Weisberg I.P. Law, P.A.

(57) ABSTRACT

A method of adaptively allocating, by a network control function, NWCF, radio resources provided by an advanced antenna system, AAS, of a radio access network, RAN. The AAS has an adaptive radio antenna arrangement configured for serving terrestrial radio user equipments, UEs. The NWCF, upon receiving information of an upcoming demand for radio resources of the RAN for serving aerial vehicle radio user equipments, UEs, maps the demand to radio resources to be allocated by the AAS for serving the aerial vehicle UEs, and instructs the AAS to allocate the radio resources for serving the aerial vehicle UEs by adapting the radio antenna arrangement of the AAS. A network control (Continued)

function, an advanced antenna system, and radio cell site equipment are provided.

18 Claims, 5 Drawing Sheets

(56) References Cited

FOREIGN PATENT DOCUMENTS

| WO | 2019048127 A1 | 3/2019 |
|----|---------------|--------|
| WO | 2019133048 A1 | 7/2019 |

OTHER PUBLICATIONS

3GPP TSG-RAN WG2 Meeting #98 R2-1704997; Title: Mobility enhancement for Drones; Agenda Item: 9.4.5; Source: Huawei, HiSilicon; Document for: Discussion; Date and Location: May 15-9, 2017, Hangzhou, China, consisting of 6-pages.
3GPP TR 36.777 V15.0.0; 3rd Generation Partnership Project; Technical Specification Group Radio Access Network; Study on Enhanced LTE Support for Aerial Vehicles (Release 15); Dec. 2017, consisting of 89-pages.
European Communication and Search Report dated Apr. 3, 2023 for Application No. 19813474.4, consisting of 12 pages.

* cited by examiner

METHOD OF AND A NETWORK CONTROL FUNCTION FOR ADAPTIVELY ALLOCATING RADIO RESOURCES, AN ADVANCED ANTENNA SYSTEM, AND RADIO CELL SITE EQUIPMENT

CROSS-REFERENCE TO RELATED APPLICATION

This application is a Submission Under 35 U.S.C. § 371 for U.S. National Stage Patent Application of International Application Number: PCT/EP2019/083054, filed Nov. 29, 2019 entitled "A METHOD OF AND A NETWORK CONTROL FUNCTION FOR ADAPTIVELY ALLOCATING RADIO RESOURCES, AN ADVANCED ANTENNA SYSTEM, AND RADIO CELL SITE EQUIPMENT," the entirety of which is incorporated herein by reference.

TECHNICAL FIELD

The present disclosure generally relates to the field of telecommunications and, more specifically, to a method of and a network control function for adaptively allocating radio resources provided by an advanced antenna system of a radio access network, an advanced antenna system and a radio cell site equipment.

BACKGROUND

For a mobile terminal or user equipment, to establish and maintain connection to a telecommunication network, such that a user of the mobile terminal may access various services including voice calls and data services without disruption while travelling or moving, it is necessary to perform so-called radio network planning and optimization.

The main aim of the radio network planning and optimization is to provide a cost-effective solution for a radio network in terms of coverage, capacity requirements and quality targets, such as call setup success rate, drop call rate etc. For a terrestrial radio network, the planning and optimization takes into consideration environmental factors and other boundary conditions, such as topography, available frequency, and so on.

Conventional radio network planning and optimization is directed to serve mobile terminal devices on or near the ground, including apartment, office and other high rise buildings. An Advanced Antenna System, AAS, of a mobile radio network is configured to provide different static radio cell shapes optimized for different environments, which may comprise macro, high rise or hot spot radio cell shapes, for example.

As an example, FIG. 1 schematically illustrates macro radio cells 10 provided by AASs 11 optimized for serving terrestrial or ground near devices. Each AAS 11 comprises multiple radio antenna elements 13, which by way of beamforming, for example, create macro radio cells 10 by main antenna lobes 12 substantially directing to the ground, such that mobile terminal devices on or near the ground 15 have optimal coverage and service. One or several of the main lobes 12 may also be directed to allow mobile terminals in high rise buildings to have good static coverage.

Directivity created by the antenna elements 13 of the AASs 11 of FIG. 1 does not provide optimized coverage for the air space 16, which may only partly be covered by side lobes of the AASs 11, for example. The conventional optimization for radio networks as illustrated in FIG. 1 does not consider objects at a high altitude such as radio user equipments, UEs, on-board of an aerial vehicle, for example an Unmanned Aerial Vehicle, UAV, flying above the ground 15 at a certain height.

Moreover, an aerial vehicle flying at higher altitudes will "see" many radio cells which do not appear in an optimized pattern for the aerial vehicle. For example, FIG. 2, which is identical to Figure H.3.2-1 of 3GPP TR 36.777 "Study on Enhanced LTE Support for Aerial Vehicles" (Release 15), shows the average number N of detectable radio cells, represented by vertical bars, and the range R in km of detected radio cells, represented by the bold line, depended on the height H in m of a UAV above ground. FIG. 2 shows that an average number of radio cells detectable by an aerial vehicle increases with the increase of the height H of the aerial vehicle above ground. An aerial vehicle flying at a height of 120 meters, for example, may on average detect about sixteen radio cells.

FIG. 3 schematically illustrates in a diagram 20 providing wide area connectivity optimized for an aerial vehicle 14 in a terrestrial cellular network. The aerial vehicle 14, such as a UAV, is in coverage areas of three radio base stations 23, 24, 25, each of which may be provided with an AAS as those illustrated in FIG. 1 (not shown in FIG. 3). The AASs have main radio antenna lobes 26 directed for serving terrestrial mobile terminals 27, i.e. on or near the ground. It is seen from FIG. 3 that only a radio antenna side lobe 22 of the AASs of the radio base stations pointing upward towards the sky, may potentially be used to serve the aerial vehicle 14.

The aerial vehicle 14, operating at certain heights, may be flying from a location A to a location B, to perform tasks such as precomputed commercial delivery or surveillance services. As the aerial vehicle 14 can detect more radio base stations, i.e. radio cells at a higher altitude, it might be difficult for UEs on-board of the aerial vehicle 14 to find a suitable radio cell, with properties and parameters needed for serving the aerial vehicle.

Taking the aerial vehicle 14 of FIG. 3 as an example, its on-board UEs are operatively connected 28 to the base station 23, while it receives interferences 29 from base stations 24 and 25. On the other hand, there can also be the situation where the UEs of the aerial vehicle 14 cannot find a suitable radio cell at all.

If a suitable radio connection is established, then the UEs of the aerial vehicle 14 might face unnecessary handovers/cell re-selections as it flies from one location to another in the coverage area of several radio base stations. The handovers/cell re-selections may cause a series of problems.

First, a very fast flying aerial vehicle may not have enough time to succeed the handover/cell re-selection procedures as another upcoming radio cell may be detected by the aerial vehicle. Besides, the frequent handover/cell re-selection in the air can negatively influence the aerial vehicle user experiences. For example, for an aerial vehicle working as a taxi, such as a helicopter aerial vehicle, for example, a stable connection needed for operation of an on-board entertainment system may be frequently interrupted as a result of a handover. Services like video surveillances may suffer similar problems caused by frequent handover/cell re-selections.

Moreover, the amount of signalling procedures triggered by unnecessary handover/cell re-selections can reduce dramatically battery power of the aerial vehicle. In addition, such additional signalling may also negatively impact the network performance on the ground for traffic and communication services in terrestrial mobile radio networks.

Accordingly, there is a need for improving radio network access and radio resource allocation for mobile devices in the air space, such as UEs of aerial vehicles, by Radio Access Networks, RANs, serving terrestrial radio user equipment.

SUMMARY

In a first aspect of the present disclosure, there is provided a method of adaptively allocating, by a network control function, NWCF, radio resources provided by an advanced antenna system, AAS, of a radio access network, RAN, the AAS having an adaptive radio antenna arrangement configured for serving terrestrial radio user equipments, UEs, the method comprising the steps of:

receiving, by the NWCF, information of an upcoming demand for radio resources of the RAN for serving aerial vehicle radio user equipments, UEs;

mapping, by the NWCF, the upcoming demand to radio resources to be allocated by the AAS for serving the aerial vehicle UEs, and instructing, by the NWCF, the AAS to allocate the radio resources for serving the aerial vehicle UEs by adapting the radio antenna arrangement of the AAS for serving the aerial vehicle UEs.

The present disclosure is based on the insight that individual steerability of respective radio antenna elements of an adaptive radio antenna arrangement forming an AAS of an RAN makes it possible to dynamically allocate radio resources provided by the AAS, based on real-time or quasi-real-time demand for radio resources from mobile devices including not only terrestrial radio UEs but also aerial vehicle UEs.

Aerial vehicle UEs may comprise any electronic equipment requiring a radio communication connection, including control equipment of a manned or unmanned aerial vehicle, any other electronic products or Internet of Things, IoT, devices on board the aerial vehicle, such as mobile telephone devices, tablets, smartphones, laptops, computers, and the like.

The allocation of radio resources of the RAN for serving aerial vehicle UEs involves, in a first step, informing the NWCF about an upcoming demand for radio resources requested by aerial vehicle UEs. Such as the demand for radio resources when the aerial vehicle starts operation in the service area of the RAN. The NWCF, after mapping the received upcoming demand for radio resources for serving the aerial vehicle UEs, instructs the AAS of the RAN to adapt its radio antenna arrangement such to provide radio access for serving the aerial vehicle UEs and to provide radio resources required by the aerial vehicle UEs at the time and in the amount in accordance with the upcoming demand for radio resources by the aerial vehicle UEs.

The present disclosure therefore allows aerial vehicles or devices in the air space to have optimized radio network coverage, such that various services requested by the aerial devices in the air space can be accommodated.

The method according to the present disclosure may be based on existing hardware of the RAN, i.e. an existing AAS, such that no addition to the hardware is required. An upgrade of processor or computer operated software of the AAS may suffice to operate the method according to the present disclosure. Hence, the present disclosure provides a more optimised usage of the currently available hardware in an established mobile operator network, which saves not only economic costs but also manpower.

The presently disclosed method considers radio resources, including radio cell characteristics, such as transmission properties and parameters of radio cells, needed for serving communication devices both in the air space and on the ground at a given point in time, and allocates the required radio resources accordingly. The present method may create, in a dynamical way, radio network cells for serving terrestrial and aerial devices, based on a resource request or demand basis and thereby achieves a balanced radio resource allocation for serving aerial vehicle UEs and ground UEs.

In an embodiment of the present disclosure, the information of an upcoming demand for radio resources may be received from at least one of an application external to both the NWCF and the aerial vehicle UEs, a network function of the RAN, a network function deployed in a telecommunications system or core network comprising or operating the RAN, and an aerial vehicle UE in communication with the NWCF.

The request for radio resources by the aerial vehicle UEs may be provided to the NWCF in various ways. As an example, an application such as an aerial vehicle controller node, which has knowledge of a flight plan of aerial vehicles may provide information to the NWCF regarding the upcoming demand for radio resources by the aerial vehicle UEs. A cellular or core network function may, based on information available from historical data measured or received from the aerial vehicle UEs, or actually measured radio conditions, predict a next radio base station for serving the aerial vehicle UEs. Such prediction may be sent from the cellular or core network function to the NWCF, informing the NWCF of the upcoming demand for radio resources. As another example, the aerial vehicle UE(s) (it)self, connected to the RAN, may send its (their) upcoming demand for radio resources to the NWCF over a control channel, for example.

In an embodiment of the present disclosure, the information of an upcoming demand for radio resources comprises at least one of a flight plan and a flight plan diversion, including flight route, flight time and flight speed of an aerial vehicle, covering a geographical area serviced by the AAS of the RAN.

The above information enables the NWCF to timely anticipate, in respect of a movement trajectory including height and location of the aerial vehicle UEs, on the timing and frequency of a handover, for example. This allows the NWCF to allocate radio resources, such as a radio antenna beam or beams elevated upwards to the aerial vehicle UEs, for providing radio network access and accommodating the upcoming request for radio resources by the aerial vehicle UEs. The NWCF can thereby instruct the AAS to allocate the radio resources for serving the aerial vehicle UEs in an accurate and reliable way, also taking into account flight speed of an aerial vehicle UE, for example. This will allow the aerial vehicle UEs to experience an optimized, such as a minimum number of handovers or radio base station or radio cell reselections during its flight from one location to another.

In an embodiment of the present disclosure, the upcoming demand comprises radio resource capacity and Quality-of-Services, QoS, requirements of radio resources to be allocated for serving the aerial vehicle UEs. The radio resource capacity may include but is not limited to radio resources such as resource blocks, physical radio bandwidths, different slot timing or numerology, to cater speed of the aerial vehicle, for example, and a more robust channel coding.

Having knowledge at the NWCF of the required data exchange capacity and QoS required by the aerial vehicle UEs is also important, as this will facilitate the NWCF to determine how the radio resources to be allocated by the AAS have to be adapted to relatively fast changing data traffic by aerial vehicle UEs. Such that proper instructions can be given by the NWCF to the AAS for adapting its radio antenna arrangement accordingly.

In an embodiment of the present disclosure, the RAN is arranged as a cellular RAN, comprising a plurality of radio network cell sites providing radio resources in a radio cell by an advanced antenna system, AAS, wherein the step of mapping comprises determining, by the NWCF, based on the information of an upcoming demand for radio resources, at least one radio cell site for allocating radio resources for serving the aerial vehicle UEs.

In practice, a RAN of a cellular network comprises radio cell sites distributed over a wide geographical region for creating radio cells serving mobile devices in respective regions. Considering that the aerial vehicle UEs operating at a certain height sees more detectable radio cells than UEs on the ground, determining a correct or most proper radio cell site(s), based on changing radio propagation conditions, for allocating radio resources for serving the aerial vehicle UEs is beneficial, as this allows to optimise the number of handovers/cell reselections to the minimum necessary for providing a required QoS, for example. In particular for an aerial vehicle travelling from one location to another at a higher speed compared to vehicles moving on the ground.

In a further embodiment of the present disclosure, the information of an upcoming demand for radio resources comprises at least one of radio cell site predictive information, assignment information, intra-system handover, inter-system handover and roaming information pertaining to the aerial vehicle UEs. This information may be available from the telecommunications network, i.e. servers, switches, and network functions operative in or for a telecommunications network.

In an embodiment of the present disclosure, the step of mapping comprises a step of determining, by the NWCF, to instruct the AAS for adapting the radio antenna arrangement based on the upcoming demand for radio resources and a demand for radio resources for serving terrestrial UEs.

The mapping step takes into account radio resources requested by both the aerial vehicle UEs and terrestrial UEs. The current radio resource allocation by the RAN may be adapted under various conditions, such as when the radio resources requested for serving terrestrial UEs are low, or when communication capacity needed by terrestrial UEs may be adjusted without compromising QoS provided to the terrestrial UEs. This enables the NWCF to balance needs from both the air space and the ground, not unnecessarily negatively affecting user experience from either side.

In a further embodiment of the present disclosure, the step of determining comprises a weighted decision, wherein instructing the AAS for adapting the radio antenna arrangement is based on weighing radio resources for serving terrestrial UEs against radio resources for serving the aerial vehicle UEs.

As a more detailed example, determining to instruct the AAS for adapting its radio antenna arrangement may be based on providing priority to the aerial vehicle UEs or the terrestrial UEs based on various factors. In other words, the NWCF will weigh communication requirements of the aerial vehicle UEs against the needs of the terrestrial UEs from different perspectives. For example, the overall radio resources allocation may be such that UEs on the ground will be served with relatively narrower beams, while the aerial vehicle UEs will be served by wider beams covering a larger aerial space. Such a dedicated beam allocation may also reduce side lobe effects to terrestrial UEs.

The weighing may also comprise a priority based decision for receiving service from the RAN, in case an areal vehicle encounters operational flight problems, for example. In such a case the aerial vehicle UEs may receive highest priority in receiving service from the RAN, in view of safety regulations or requirements, for example.

In still a further embodiment of the present disclosure, the NWCF dynamically instructs the AAS to allocate radio resources for serving the aerial vehicle UEs based on at least one of an actual demand for radio resources and priority requirements for providing radio resources by the AAS.

As the aerial vehicle UEs constantly move from one location to another location, their demand for radio resources versus priority requirements is seen to change constantly as well. The dynamic instruction from the NWCF as to how the radio resources are to be allocated caters a rapidly time and location varying need by the aerial vehicle UEs, thereby ensuring the required or a sufficient QoS and user experience, and avoiding unnecessary handovers or cell reselections by the aerial vehicle UEs.

In an embodiment of the present disclosure, the step of instructing the AAS for adapting the radio antenna arrangement comprises instructing the AAS for creating a temporarily geographically separate radio cell, identified by a separate radio cell identity, comprising radio resources adapted for serving the aerial vehicle UEs.

An especially practical approach of adapting the radio antenna arrangement of the AAS is to create a geographically separate radio cell dedicated for serving the aerial vehicle UEs. This also ensures that the separate radio cell may have the right radio cell shape and radio antenna beam direction into the air space, with properties and parameters suitable for serving the aerial vehicle UEs.

In an embodiment of the present disclosure, the method further comprises instructing, by the NWCF, the AAS to revert the adaptation of the radio antenna arrangement, based on at least one of the information of an upcoming demand for radio resources for serving aerial vehicle UEs and an actual demand for radio resources for serving aerial vehicle UEs.

It can be contemplated that the adaptation of the radio antenna arrangement may be reverted depending on practical application scenarios, which take into consideration the rapid movement and constantly changing traffic of the aerial vehicle UEs. This allows more flexibility and better allocation of radio resources based on a real-time need from both the air space and the ground based communication equipment.

In an embodiment of the present disclosure, the AAS is operated by radio cell site equipment, arranged for providing radio base station functionality, wherein instructions by the NWCF for the AAS are provided through the radio cell site equipment.

The radio cell site equipment is, for example a radio base station, RBS, or a radio base station function configured for operating the AAS. In the case of processor or computer controlled radio cell site equipment, the RAN needs no adaptation or upgrade in terms of hardware.

In a second aspect of the present disclosure, there is provided a network control function, NWCF, arranged in a data processing device deployed in a telecommunications system comprising a radio access network, RAN, providing radio resources by an advanced antenna system, AAS, having an adaptive radio antenna arrangement configured for serving terrestrial radio user equipments, UEs, the NWCF being arranged for operating in accordance with the above method of the first aspect of the present disclosure.

In a third aspect of the present disclosure, there is provided an advanced antenna system, AAS, of a radio access network, RAN, of a telecommunications system, the AAS having an adaptive radio antenna arrangement configured for serving terrestrial radio user equipments, UEs, the radio antenna arrangement comprising a plurality of radio antenna elements and a radio antenna control unit arranged for controlling operation of a plurality of radio resources provided by the AAS, the radio antenna control unit arranged for receiving, from a network control function, NWCF, deployed in the telecommunications system, at least one of instructions for allocating radio resources, based on an upcoming demand for radio resources for serving aerial vehicle radio user equipments, UEs, by adapting the radio antenna arrangement and instructions for reverting the adaptation of the radio antenna arrangement.

In an embodiment of the present disclosure, the radio antenna control unit is arranged for adapting the radio antenna arrangement for allocating radio resources for meeting requirements of the upcoming demand for serving the aerial vehicle UEs. Such an AAS, when operating under the control of the radio antenna control unit, may be able to use currently available hardware resources of the RAN to accommodate demands for radio resources by aerial vehicle UEs in accordance with the present disclosure.

The radio antenna control unit can steer and adapt respective radio antenna elements, by controlling phases and amplitudes of the antenna element signals, for transmitting and/or receiving purposes, such that radio resources suitable for serving the aerial vehicle UEs can be allocated accordingly.

In an embodiment of the present disclosure, the radio antenna arrangement is configured for operation in split mode, wherein part of the radio antenna elements is operated by the radio antenna control unit for adapting the antenna arrangement for creating a temporarily separate geographical radio cell, identified by a separate radio cell identity, covering a flying area of the aerial vehicle UEs and providing radio resource and Quality-of-Service, QoS, requirements for serving the aerial vehicle UEs.

In this example, a group of antenna elements is controlled by the radio antenna control unit to create a radio cell geographically separate from presently available radio cells for serving the terrestrial UEs. This separate radio cell may have a radio cell shape particularly arranged for serving the aerial vehicle UEs. A separate radio cell specially adapted for serving the aerial vehicle UEs also implies less effect of side lobes for terrestrial UEs and fewer handovers or radio cell reselections for the aerial vehicle UEs.

In a fourth aspect of the present disclosure, there is provided a radio cell site equipment, arranged for providing radio base station functionality in a radio cell of a radio access network, RAN, of a telecommunications system, the radio cell site equipment operating an advanced antenna system, AAS, having an adaptive radio antenna arrangement configured for providing radio resources for serving terrestrial radio user equipments, UEs, in the radio cell, the radio antenna arrangement comprising a plurality of radio antenna elements and a radio antenna control unit arranged for controlling operation of a plurality of radio resources provided by the AAS.

The radio cell site equipment arranged for receiving, from a network control function, NWCF, deployed in the telecommunications system, at least one of instructions based on an upcoming demand for radio resources for serving aerial vehicle radio user equipments, UEs, covering a geographical area serviced by the radio cell site equipment, for operating the AAS for adapting the radio antenna arrangement for serving the aerial vehicle UEs, and instructions for reverting the adaptation of the radio antenna arrangement.

In a fifth aspect of the present disclosure, there is provided a computer program product, comprising a computer readable storage medium storing instructions which, when executed on at least one processor, cause the at least one processor to carry out the above method of the first aspect of the present disclosure.

The above mentioned and other features and advantages of the disclosure will be best understood from the following description referring to the attached drawings. In the drawings, like reference numerals denote identical parts or parts performing an identical or comparable function or operation.

BRIEF DESCRIPTION OF THE DRAWINGS

FIG. 8 schematically illustrates an advanced antenna system, AAS, of a Radio Access Network, RAN, of a telecommunications system, according to the present disclosure.

DETAILED DESCRIPTION

Embodiments contemplated by the present disclosure will now be described in more detail with reference to the accompanying drawings. The disclosed subject matter should not be construed as limited to the embodiments set forth herein. Rather, the illustrated embodiments are provided by way of example to convey the scope of the subject matter to those skilled in the art.

Figure 1:
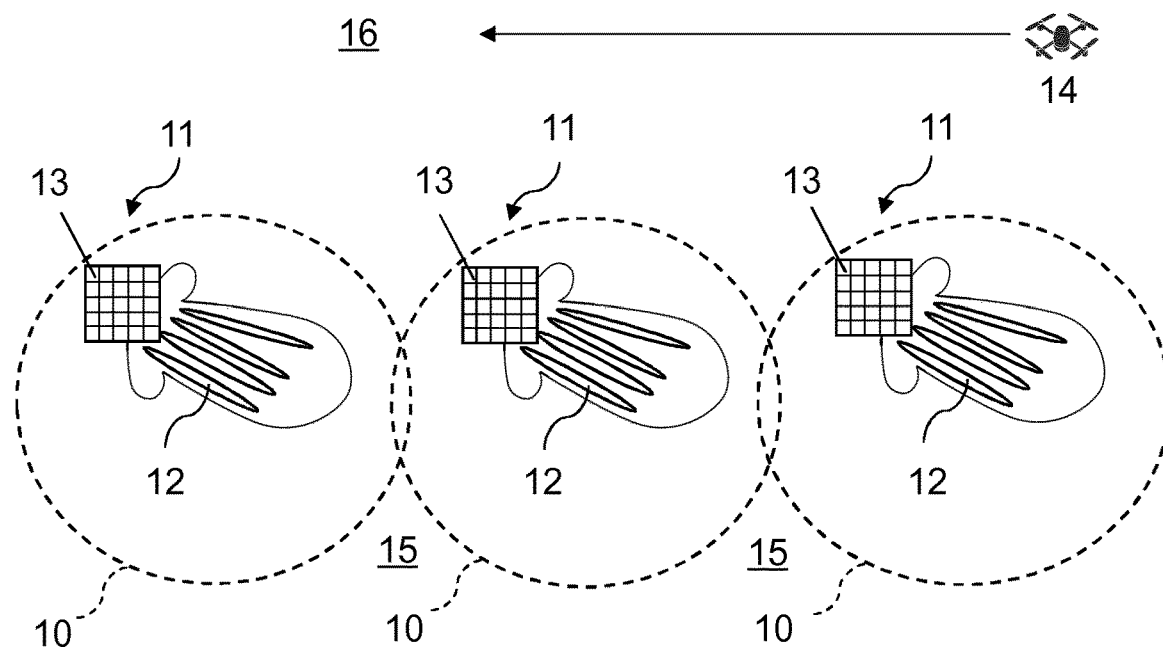
FIG. 1 schematically illustrates macro radio cells provided by AASs optimized for serving ground near devices.
Figure 2:
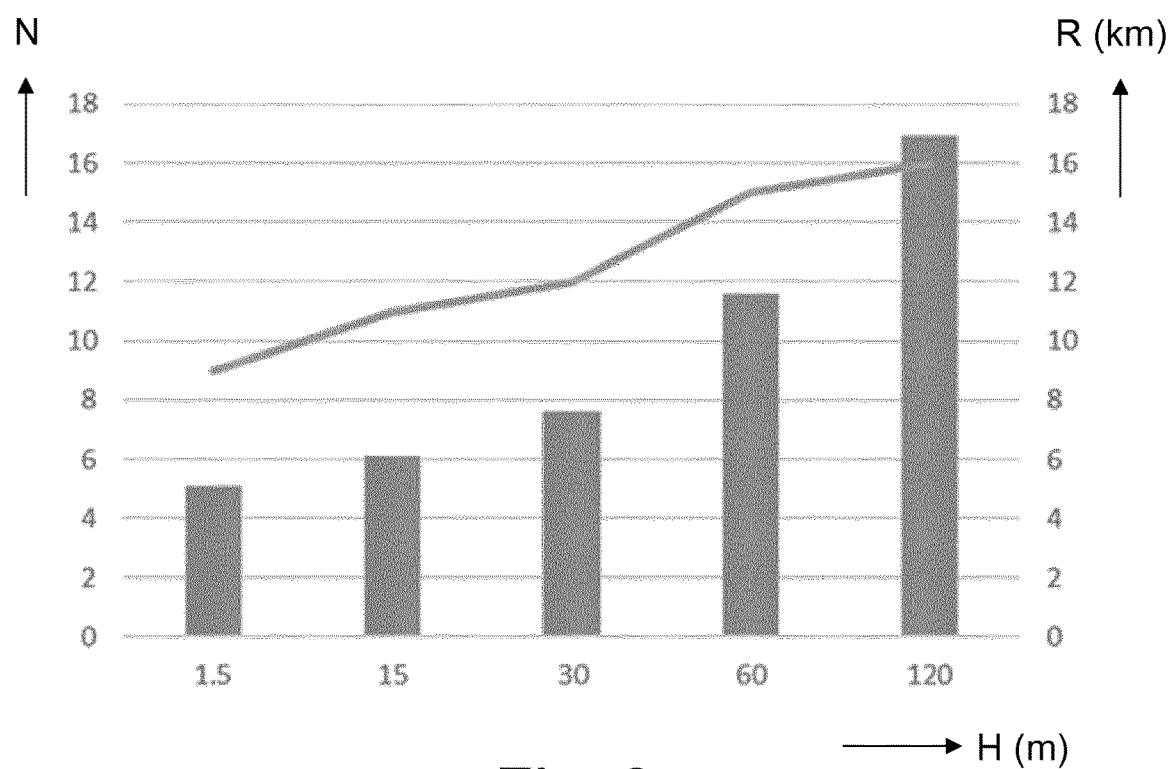
FIG. 2 graphically illustrates an average number of detectable radio cells and the range of detected radio cells of a Radio Access Network, RAN, by an aerial vehicle depended on its height when flying above the ground, according to 3GPP TR 36.777, "Study on Enhanced LTE Support for Aerial Vehicles" (Release 15).
Figure 3:
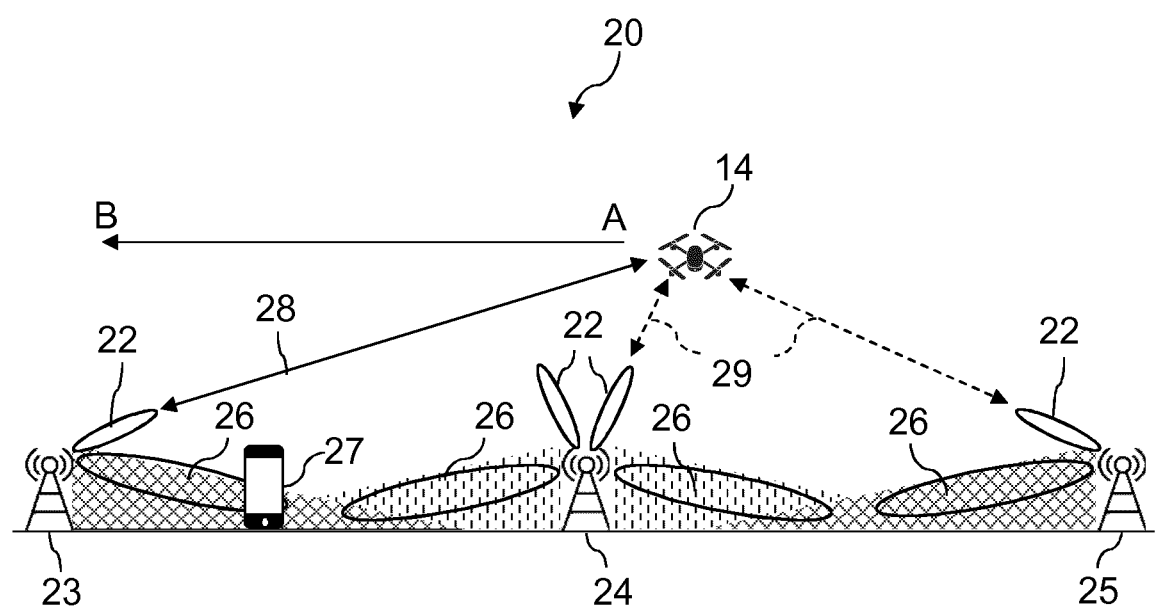
FIG. 3 schematically illustrates wide area connectivity optimized for an aerial vehicle in the coverage area of a terrestrial cellular radio network.
Figure 4:
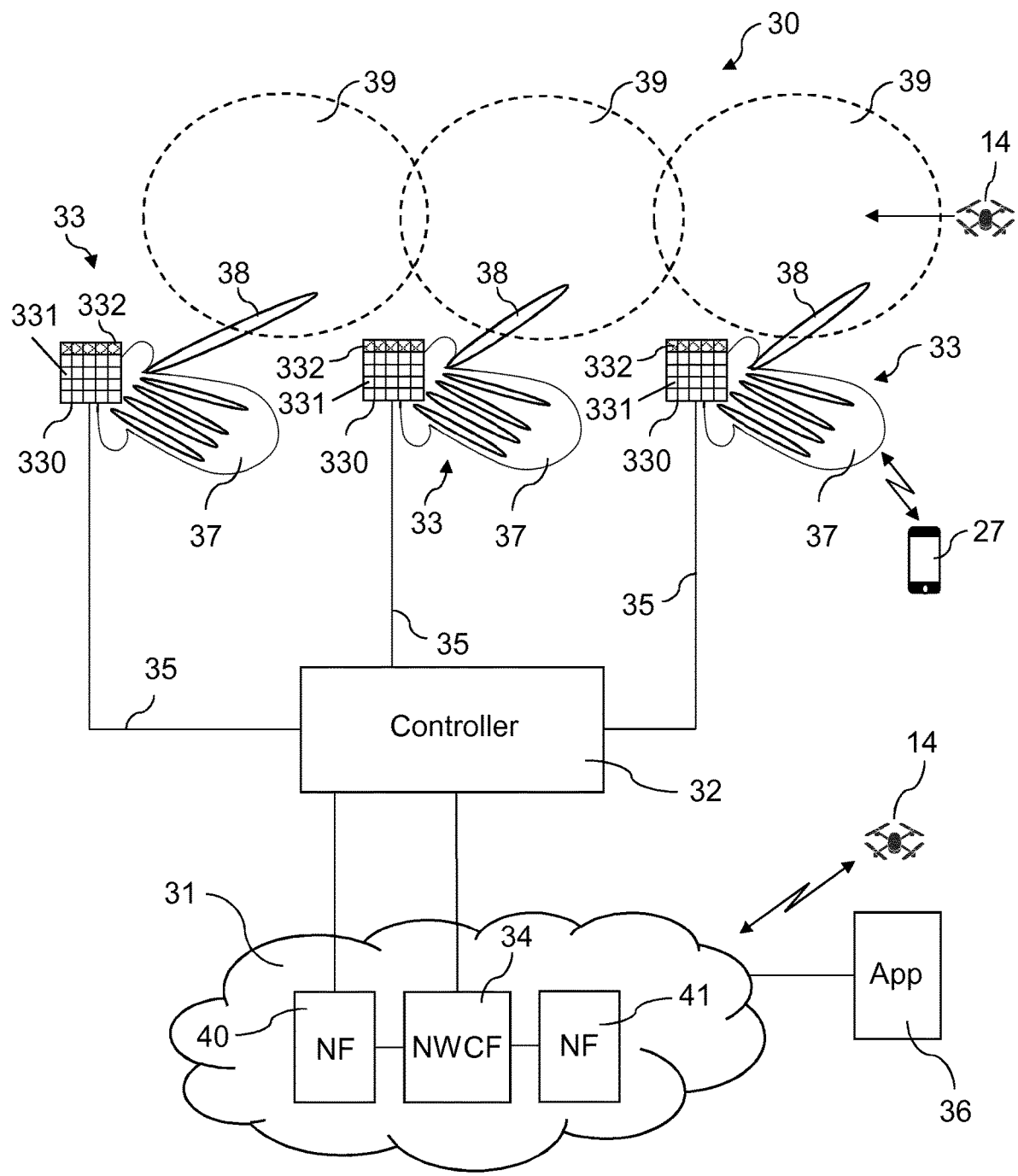
FIG. 4 schematically illustrates a diagram of adaptively providing radio resources for serving an aerial vehicle by a Radio Access Network, RAN, in a telecommunication system, in accordance with an embodiment of the present disclosure.

FIG. 4 schematically illustrates an exemplary embodiment of adaptively providing radio resources for serving an aerial vehicle 14 by a Radio Access Network, RAN, 30 operating with a telecommunications system 31, in accordance with the present disclosure.

The RAN 30 comprises radio cell site equipment 33, arranged at a plurality of radio network cell sites or radio sites, for providing radio base station, RBS, functionality or base station controller functions. The plurality of radio sites provide radio access for terrestrial mobile telephone devices, Internet of Things, IoT, devices, tablets, smartphones, laptops, computers, etc., generally designated radio User Equipment, UE, 27 and coordinates the management of radio resources across the radio sites. A radio cell site equipment controller 32 operates or is operatively connected 35 to the radio cell site equipment 33, for providing radio resources for serving terrestrial UE 27.

The radio cell site equipment 33 each comprise an advanced antenna system, AAS, 330, configured for serving terrestrial UE 27. The AASs 330 comprise an adaptive radio antenna arrangement, such as a controllable or steerable antenna array, having a plurality of radio antenna elements 331. The AASs 330 may each be controlled by a radio antenna control unit (not shown) and/or the radio cell site equipment controller 32, supporting radio beam forming and Multiple Input Multiple Output, MIMO, antenna techniques, to generate antenna radiation patterns 37 suitable for serving terrestrial UE 27.

In accordance with the present disclosure, the RAN 30 is also arranged for serving radio user equipments, UEs, on board of an aerial vehicle 14, such as an Unmanned Aerial Vehicle, UAV, that is any electronic equipment requiring a radio communication or radio access connection, either equipment for operating and controlling the aerial vehicle, such as a UAV, and/or any other on-board electronic equipment, as a whole designated by the term aerial vehicle UEs. For example, by controlling the AASs 330 to provide radio access resources, such as radio beams elevated upwards to the aerial vehicle 14, providing separate geographical or physical radio cells 39, for example, for accommodating the upcoming and frequently and fast changing requests for radio resources by the aerial vehicle 14.

In the telecommunication network 31 a network control function, NWCF, 34, is provided and arranged for adaptively allocating radio resources provided by the radio cell site equipment 33 and/or the AASs 330, such that the aerial vehicle 14 can be served by the AASs 330 of the RAN 32.

A separate application, App, 36 such as an external aerial vehicle application server or aerial vehicle control node, may be connected to the telecommunication system 31, and arranged for providing to the NWCF 34 of the telecommunication system 31 information about an upcoming demand for radio resources of the RAN 30 by the aerial vehicle 14. Although just a single application 36 is shown, in practical embodiment several separate applications may provide information to the NWCF 34.

In the following, a method of adaptively allocating, by an NWCF, radio resources provided by a RAN in accordance with the present disclosure, will be described with reference to FIG. 4 and FIG. 5, the latter showing a simplified flow chart diagram illustrating steps of the method. The steps proceed from the top to the bottom of the figure.

The method 43 starts with step 44, "Receiving information of an upcoming demand for radio resources for serving aerial vehicle UEs". At this step, the NWCF 34 receives information, such as an event, about an upcoming demand for radio resources for the aerial vehicle 14, such as radio resources required for commercial delivery of goods, radio resources for taxi or surveillance services, executed by aerial vehicles 14 in a geographical sector served by the RAN 30 or.

The information of the upcoming demand for radio resources by an aerial vehicle 14 may be received in a variety of ways. For example, the information may be received from the separate application 36, such as an aerial vehicle flight control and schedule centre, which is external to both the NWCF 34 and the aerial vehicle 14. Information as to aerial vehicle flights may be stored in the application 36 beforehand, and optionally updated dynamically, according to real-time movement or travel data of the aerial vehicle 14. As a result, up-to-date demand for radio resources by the aerial vehicle 14 is available to the application 36 and therefore to the NWCF 34.

The information of the upcoming demand for radio resources by an aerial vehicle 14 may also be received from a network function, NF, 40 serving the RAN 30, and/or an other network function, NF, 41 deployed in the telecommunications system 31. The network functions may maintain historical records of aerial vehicle flights and can thereby predict or forecast the demand for radio resources and provide information of the upcoming demand for radio resources to the NWCF 34, when applicable.

Information of the upcoming demand by the aerial vehicle 14 may also be provided from the aerial vehicle 14 itself, in communication with the NWCF 34. For example, the aerial vehicle 14 may send the information about its upcoming demand to the NWCF 34, when the aerial vehicle 14 is not operated, such as when the aerial vehicle 14 is at its parking position and connects to the telecommunications network 31, for example by a WiFi or other connection.

The NWCF 34 may also receive information on an upcoming demand for radio resources of the aerial vehicle 14 from the radio cell site equipment controller 32, based on radio cell site predictive information for inter-cell handover, intra-cell handover and radio cell assignment, for example. Other information on upcoming demand for radio resources may be based on intra-system handover, inter-system handover and roaming information pertaining to the aerial vehicle 14. This information may also be available from the telecommunications network, i.e. servers, switches, and network functions operative in or for a telecommunications network, such as illustrated by the network functions 40 and 41.

The information of an upcoming demand for radio resources may comprise various types of information about flights of an aerial vehicle, such as a flight plan or a flight plan diversion, which may include a flight route, flight time and flight speed of the aerial vehicle. The flight route or flight plan covers a geographical area serviced by the AAS 330 of the RAN 30.

Such information enables the NWCF 34 to anticipate on a movement trajectory including heights and locations of the aerial vehicle, and timing and frequency of handover of the aerial vehicle, for example. This allows the NWCF 34 to know how to set up radio resources of the RAN 30, such as radio beams elevated upwards to the aerial vehicle 14, providing separate geographical or physical radio cells 39, for example, for accommodating the upcoming and frequently and fast changing requests for radio resources by the aerial vehicle 14.

Further to the above, the information of the upcoming demand of radio resources for the aerial vehicle 14 may comprise information on radio resource or data exchange capacity and Quality of Services, QoS, required by the aerial vehicle 14. For example, number of resource blocks, radio bandwidth, radio slots and radio slot timing or numerology, channel and radio codecs to be used, etc. Those skilled in the art will appreciate that the actual resources selected depend on the type of communication technology used.

All this information allows the NWCF 34 to decide as to a more detailed control to have suitable radio resources allocated for serving the aerial vehicle UEs in different operational environments, at different times, and in different amounts or capacity, and in accordance with a required QoS, for example.

After receiving the information of the upcoming demand for radio resources for serving the aerial device UEs, at step 45, "Mapping upcoming demand to radio resources of AAS for serving aerial vehicle UEs", the NWCF 34 maps the radio resources requested by the aerial vehicle 14, as indicated in the upcoming demand, to existing radio resources to be allocated by the AASs 330 for serving the aerial vehicle 14.

As the RAN 30 comprises a plurality of radio network cell sites, each comprising a radio cell site equipment 33, the mapping step 45 first determines a particular radio cell site equipment 33 for serving the aerial vehicle 14 with its AAS 330, taking into consideration environmental factors, propagation conditions, etc.

The mapping step 45 may comprise a step 46 of "Determining adaptation of radio antenna arrangement of AAS based on (actual) demand for radio resources by aerial vehicle UEs and terrestrial UEs".

As the RAN 30 is originally arranged for serving terrestrial UE 27, the mapping step 45 involves making a decision as to adapting the radio antenna arrangement of the AAS, by taking into consideration demands for radio resources from both the terrestrial UE 27 and the aerial vehicle 14. This determination process is a dynamic procedure, taking into consideration the constant and rapid varying characteristics of air traffic and the radio resources required thereby.

The determination step 46 balances radio resource needs from both the air space and the ground. As an example, adaptation of the radio antenna arrangement of an AAS 330 may be determined based on conditions such as low radio resources requested for serving the terrestrial UE 27, or communication capacity needed by the terrestrial UE 27 adjustable without compromising QoS provided to the UE 27. The adaptation step 46 allows a more optimized hardware usage in a mobile operator radio network.

The mapping step 45 may comprise a further step 47 of "Determining adaptation of radio antenna arrangement based on radio resource capacity considerations/decisions for serving aerial vehicle UEs and terrestrial UEs".

Depending on the radio resource capacity of the RAN 30 for serving the terrestrial UE 27, such as a macro beam 37 required for serving the terrestrial UE 27, the mapping by the NWCF 34 may take a weighted decision as to whether the RAN 30 shall temporarily set up an air space beam 38 or not. The weighted decision may be based on weighing availability and demand for radio resources for serving terrestrial UE 27 against radio resources for serving the aerial vehicle 14, dependent on several decision criteria.

The weighted decision may be based on service priority criteria about whether to setup up a beam in the air space. Traffic requests for the aerial vehicle 14 may be handled in priority order, always compared to the priority and traffic capacity needs on the ground level for the terrestrial UE 27.

Furthermore, the NWCF 34 may also dynamically receive changed priority or other decision criteria, in terms of network settings, for example, and may instructs the AAS 330 to adapt the allocation of radio resources accordingly.

As a result of the mapping step 45, at step 48, "Instructing AAS to allocate radio resources by adapting radio antenna arrangement of AAS", the NWCF 34 instructs the AAS 330, by way of a corresponding radio cell site equipment 33 and radio cell site controller 32, to allocate radio resources meeting the upcoming demand of the aerial vehicle 14.

As an example, the NWCF 34 may instruct radio cell site equipment 33 of an RBS selected for allocating radio resources for serving the aerial vehicle 14 to have its AAS 330 operate in a so-called split mode, for example. This means that from the antenna array forming the adaptive radio antenna arrangement of the AAS 330 a number of radio antenna elements is split off, for example those radio antenna elements illustrated as shaded antenna elements 332 in FIG. 4.

The radio antenna elements 332 are than controlled to temporarily create a radio antenna beam 38 directed upwards to the operating area of the aerial vehicle 14, forming a new geographical or physical radio cell 39, with a new radio cell identity, and covering the flight route of the aerial vehicle 14. By selecting a particular number and position of radio antenna elements 332 of the AAS 330 the shape or coverage area of the new geographical radio cell 39 may be set, with properties and parameters, such as different Synchronization Signal Block, SSB, configuration, for example, suitable for serving communication traffic by and from the fast moving aerial vehicle 14.

Furthermore, at step 49, "Revert adaptation of radio antenna arrangement", when the aerial vehicle 14 has passed a radio cell site, i.e. the coverage area provided by the AAS 330 of that radio cell site, the NWCF 34 may instruct this AAS 330 to shut down the newly created radio cell 39 and assign the used antenna elements 332 back to the existing antenna array, for example for creating the macro radio cell shape 37 for serving the terrestrial UE 27.

The method described above allows dynamic creation of a radio network cell with the properties and parameters needed for serving radio communication needs of aerial vehicle UEs in the air space, and may be implemented by using existing hardware in the mobile operator network, without installing dedicated hardware, but updated control software of the radio cell site equipment and/or radio cell site controller, for example.

The method provides for a re-use of existing network capabilities with just a temporarily impact to the RAN by way of capacity reduction for serving terrestrial UEs. The method achieves an optimized, i.e. minimum number of handovers/cell reselections for an aerial vehicle, that is traveling from a first location to a second location in the air space and coverage area of the RAN, as beamforming techniques may be used providing radio access towards the aerial vehicle. Such a directed beam may also create less effect of side lobes because the dynamically created radio cell beam deliberately radiates in the direction of the aerial vehicle. Disturbance to or deterioration of the operation of the terrestrial radio access network may be effectively limited or even avoided.

Figure 6:
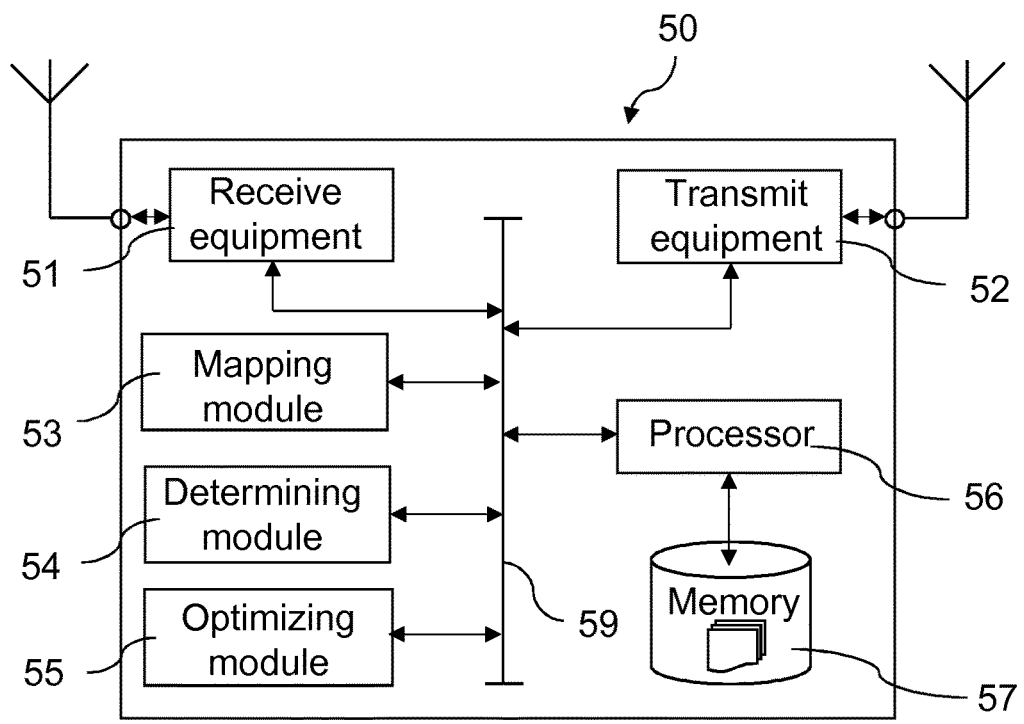
FIG. 6 schematically illustrates a network control function, NWCF arranged for performing the method of the present disclosure.

FIG. 6 schematically illustrates a network control function, NWCF 50, arranged for performing the method of the present disclosure.

The NWCF 50 may be arranged in a data processing device deployed in a telecommunications system comprising or operating a radio access network, RAN. The RAN provides radio resources by way of an advanced antenna system, AAS, having an adaptive radio antenna arrangement configured for serving terrestrial radio user equipment, UE.

Figure 5:
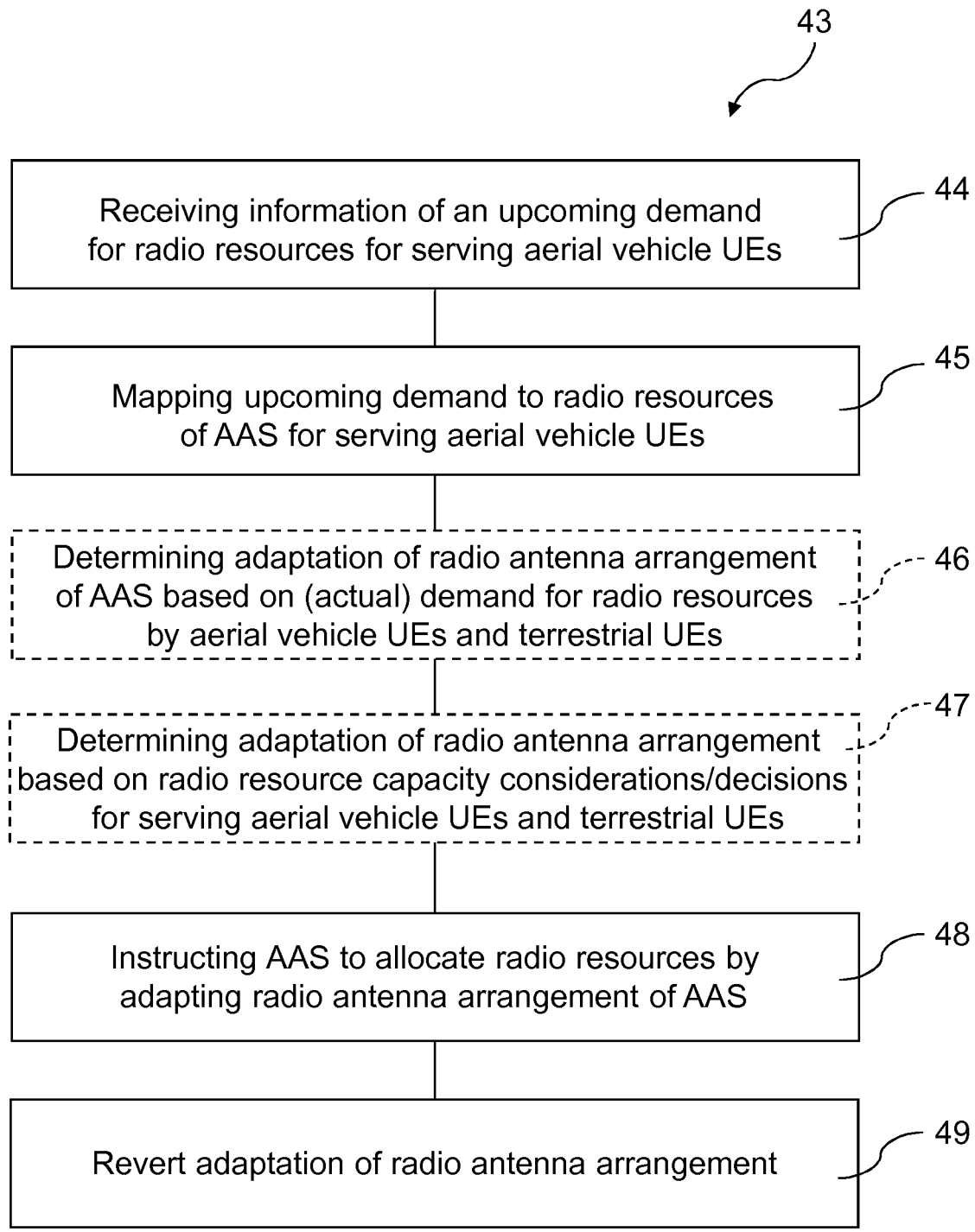
FIG. 5 illustrates, in a simplified flow diagram, steps of a method of adaptively allocating radio resources provided by a Radio Access Network, RAN, in accordance with an embodiment of the present disclosure.

The NWCF 50 comprises receive equipment 51, transmit equipment 52, mapping equipment 53, determining equipment 54, and optimizing equipment 55 or modules, performing the steps illustrated with FIG. 5 above, for example.

The receive equipment 51 is arranged for receiving information of an upcoming demand for radio resources for serving aerial vehicle UEs by the RAN. The transmit equipment 52 is arranged for transmitting an instruction to an AAS, to allocate the radio resources for serving the aerial vehicle UEs by adapting the radio antenna arrangement of the AAS accordingly. The mapping equipment 53 is arranged for mapping the upcoming demand to radio resources to be allocated by the AAS for serving the aerial vehicle UEs.

The determining equipment 54 is arranged for determining, based on the information of an upcoming demand for radio resources, of at least one radio cell site for allocating radio resources for serving the aerial vehicle UEs. The determining equipment 54 may further be arranged for determining to instruct the AAS for adapting the radio antenna arrangement based on the upcoming demand for radio resources and a demand for radio resources for serving terrestrial UE.

The optimizing equipment 55 may be arranged for optimizing the allocation of radio resources based on weighing demand for radio resources for serving terrestrial UE against radio resources demanded for serving the aerial vehicle UEs.

The NWCF 50 further comprises a processor 56 connected to the above described equipment or modules 53-55 of the NWCF 50 via an internal data communication bus 59, for controlling operation of the equipment or modules. Furthermore, the NWCF 50 may also comprise a memory 57, arranged for storing information including information about the upcoming demand for radio resources by aerial vehicle UEs and/or historical demand data.

Figure 7:
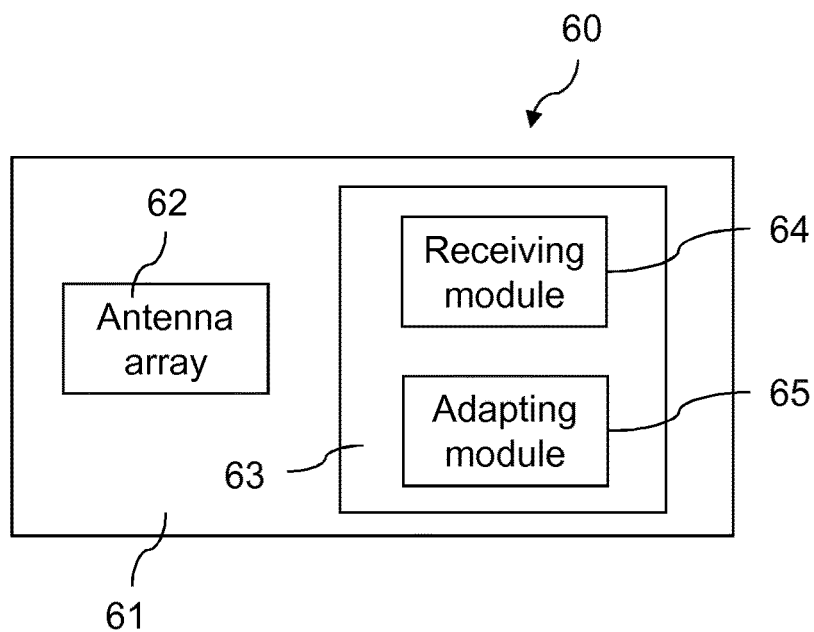
FIG. 7 schematically illustrates an advanced antenna system, AAS, of a Radio Access Network, RAN, of a telecommunications system, in accordance with the present disclosure.

FIG. 7 schematically illustrates an advanced antenna system, AAS 60, of a radio access network, RAN, of a telecommunications system.

The AAS 60 comprises an adaptive radio antenna arrangement 61 configured for serving terrestrial radio user equipment, UE. The radio antenna arrangement 61 comprises an antenna array 62 having a plurality of radio antenna elements and a radio antenna control unit 63.

The radio antenna elements of the radio antenna array 62 may be dynamically "assigned" towards the air space, under the control of the radio antenna control unit 63, so as to create a new geographically separate or physical radio cell, with a new physical identify and parameters and properties optimized for serving aerial vehicle UEs.

To this end, in an embodiment, the antenna array 62 may be controlled to split into segments comprising a particular number of radio antenna elements of different positions at the antenna array 62. Those array segments can be individually steered by the RAN. In that way, the AAS 60 can create an additional geographical radio cell with a cell shape tilt and directed upwards to serve an aerial vehicle and UEs on-board the aerial vehicle.

Radio cell configuration can be adapted for serving communication needs of the aerial vehicle UEs. Using digital or analogue beamforming allows traffic handling in the same way as for radio cells directed towards the ground.

The radio antenna control unit 63 comprises a receiving module 64 and an adapting module 65. The receiving module 64 is arranged for receiving, from a network control function, NWCF, deployed in the telecommunications system, instructions for allocating radio resources, based on an upcoming demand for radio resources for serving aerial vehicle UEs. The receiving module 64 is further arranged for receiving instructions for reverting the adaptation of the radio antenna arrangement.

The adapting module 65 is arranged for adapting the radio antenna arrangement by controlling its antenna elements using beamforming and MIMO techniques, for example. The modules 64 and 65 may operate under processor control, for example.

Although in the examples, embodiments and the figures disclosed and discussed above operation of a single aerial vehicle is described and shown, those skilled in the art will appreciate that the method and equipment according to the present disclosure may process demands from a plurality of aerial vehicles simultaneously operating in the coverage area of a radio access network.

The present disclosure is applicable with a number of different mobile cellular radio technologies, such as designated GSM (Global System for Mobile Communications) or 2G digital cellular communications, General Packet Radio Service (GPRS), Enhanced Data Rates for GSM Evolution (EDGE), UMTS (Universal Mobile Telecommunications System) and CDMA2000 (Code Division Multiplex Access) or 3G digital cellular communications, LTE (Long Term Evolution) and LTE-Advanced, also called 4G cellular communication, up to the fifth generation 5G digital cellular communication technology, and may be modified and enhanced by those skilled in the art beyond the scope of the present disclosure as disclosed in the appended claims, without having to apply inventive skills.

The invention claimed is:

1. A method of adaptively allocating, by a network control function, NWCF, radio resources provided by an advanced antenna system, AAS, of a radio access network, RAN, the AAS having an adaptive radio antenna arrangement configured for serving terrestrial radio user equipments, UEs, the method comprising the steps of:

receiving, by the NWCF, information of an upcoming demand for radio resources of the RAN for serving aerial vehicle radio user equipments, UEs, the information of an upcoming demand for radio resources for serving the aerial vehicle UEs received from at least one of an application external to both the NWCF and the aerial vehicle UEs, a network function of the RAN, a network function deployed in a telecommunications system comprising the RAN, and an aerial vehicle UE in communication with the NWCF and the information of an upcoming demand for radio resources for serving the aerial vehicle UEs comprising at least one of a flight plan and a flight plan diversion, including flight route, flight time and flight speed of an aerial vehicle, covering a geographical area serviced by the AAS of said the RAN;

mapping, by the NWCF, the upcoming demand to radio resources to be allocated by the AAS for serving the aerial vehicle UEs; and instructing, by the NWCF, the AAS to allocate the radio resources for serving the aerial vehicle UEs by adapting the radio antenna arrangement of the AAS for serving the aerial vehicle UEs.

2. The method according to claim 1, wherein the upcoming demand for serving the aerial vehicle UEs comprises radio resource capacity and Quality-of-Services, QoS, requirements of radio resources to be allocated for serving the aerial vehicle UEs.

3. The method according to claim 1, wherein the RAN is arranged as a cellular RAN, comprising a plurality of network radio cell sites providing radio resources in a radio cell by an AAS, wherein the step of mapping comprises determining, by the NWCF, based on the information of an upcoming demand for radio resources for serving the aerial vehicle UEs, at least one radio cell site for allocating radio resources for serving the aerial vehicle UEs.

4. The method according to claim 3, wherein the information of an upcoming demand for radio resources for serving the aerial vehicle UEs comprises at least one of radio cell site predictive information, assignment information, intra-system handover, inter-system handover and roaming information pertaining to the aerial vehicle UEs.

5. The method according to claim 1, wherein the step of mapping comprises determining, by the NWCF, to instruct the AAS for adapting the radio antenna arrangement based on the upcoming demand for radio resources for serving the aerial vehicle UEs and a demand for radio resources for serving terrestrial UEs.

6. The method according to claim 5, wherein the step of determining comprises a weighted decision, wherein instructing the AAS for adapting the radio antenna arrangement is based on weighing radio resources for serving terrestrial UEs against radio resources for serving the aerial vehicle UEs.

7. The method according to claim 5, wherein the NWCF dynamically instructs the AAS to allocate radio resources for serving the aerial vehicle UEs based on at least one of an actual demand for radio resources and priority requirements for providing radio resources by the AAS.

8. The method according to claim 1, wherein the step of instructing the AAS for adapting the radio antenna arrangement comprises instructing the AAS for creating a temporarily geographically separate radio cell, identified by a separate radio cell identity, comprising radio resources adapted for serving the aerial vehicle UEs.

9. The method according to claim 1, further comprising instructing, by the NWCF, the AAS to revert the adaptation of the radio antenna arrangement, based on at least one of the information of an upcoming demand for radio resources for serving aerial vehicle UEs and an actual demand for radio resources for serving aerial vehicle UEs.

10. The method according to claim 1, wherein the AAS is operated by radio cell site equipment, arranged for providing radio base station functionality, wherein instructions by the NWCF for the AAS are provided through the radio cell site equipment.

11. The method according to claim 1, wherein the information of an upcoming demand for radio resources for serving the aerial vehicle UEs comprises at least one of a flight plan and a flight plan diversion, including flight route, flight time and flight speed of an aerial vehicle, covering a geographical area serviced by the AAS of the RAN.

12. The method according to claim 1, wherein the upcoming demand for serving the aerial vehicle UEs comprises radio resource capacity and Quality-of-Services, QoS, requirements of radio resources to be allocated for serving the aerial vehicle UEs.

13. The method according to claim 1, wherein the RAN is arranged as a cellular RAN, comprising a plurality of network radio cell sites providing radio resources in a radio cell by an AAS, wherein the step of mapping comprises determining, by the NWCF, based on the information of an upcoming demand for radio resources for serving the aerial vehicle UEs, at least one radio cell site for allocating radio resources for serving the aerial vehicle UEs.

14. A network control function, NWCF, deployed in a telecommunications system comprising a radio access network, RAN, providing radio resources by an advanced antenna system, AAS, having an adaptive radio antenna arrangement configured for serving terrestrial radio user equipments, UEs, the NWCF configured for adaptively allocating, radio resources provided by an advanced antenna system, AAS, of a radio access network, RAN, the AAS having an adaptive radio antenna arrangement configured for serving terrestrial radio user equipments, UEs, the method comprising:
receiving, by the NWCF, information of an upcoming demand for radio resources of the RAN for serving aerial vehicle radio user equipments, UEs, the information of an upcoming demand for radio resources for serving the aerial vehicle UEs received from at least one of an application external to both the NWCF and the aerial vehicle UEs, a network function of the RAN, a network function deployed in a telecommunications system comprising the RAN, and an aerial vehicle UE in communication with the NWCF and the information of an upcoming demand for radio resources for serving the aerial vehicle UEs comprising at least one of a flight plan and a flight plan diversion, including flight route, flight time and flight speed of an aerial vehicle, covering a geographical area serviced by the AAS of said the RAN;
mapping, by the NWCF, the upcoming demand to radio resources to be allocated by the AAS for serving the aerial vehicle UEs; and
instructing, by the NWCF, the AAS to allocate the radio resources for serving the aerial vehicle UEs by adapting the radio antenna arrangement of the AAS for serving the aerial vehicle UEs.

15. An advanced antenna system, AAS, of a radio access network, RAN, of a telecommunications system, the AAS having:
an adaptive radio antenna arrangement configured for serving terrestrial radio user equipments, UEs, the adaptive radio antenna arrangement comprising a plurality of radio antenna elements and a radio antenna control unit arranged for controlling operation of a plurality of radio resources provided by the AAS, the radio antenna control unit arranged for receiving, from a network control function, NWCF, deployed in the telecommunications system, at least one of instructions for allocating radio resources, based on an upcoming demand for radio resources for serving aerial vehicle radio user equipments, UEs, by adapting the radio antenna arrangement and instructions for reverting the adaptation of the radio antenna arrangement, the instruction from the NWCF to adapt the allocation of radio resources based on dynamically received changed priority or other decision criteria in terms of network settings, the priority always compared to the priority of and traffic capacity needs on the ground level for the terrestrial UEs.

16. The advanced antenna system, AAS, according to claim 15, wherein the radio antenna control unit is arranged for adapting the radio antenna arrangement for allocating radio resources for meeting radio resource capacity and Quality-of-Service, QoS, requirements of the upcoming demand for serving the aerial vehicle UEs.

17. The advanced antenna system, AAS, according to claim 15, wherein the radio antenna arrangement is configured for operation in split mode, wherein part of the radio antenna elements is operated by the radio antenna control unit for adapting the antenna arrangement for creating a temporarily geographically separate radio cell, identified by a separate radio cell identity, covering a flying area of the aerial vehicle UEs and providing radio resource capacity and Quality-of-Service, QoS, requirements for serving the aerial vehicle UEs.

18. A radio cell site equipment, arranged for providing radio base station functionality in a radio cell of a radio access network, RAN, of a telecommunications system, the radio cell site equipment operating an advanced antenna system, AAS, having an adaptive radio antenna arrangement configured for providing radio resources for serving terrestrial radio user equipments, UEs, in the radio cell, the radio antenna arrangement comprising a plurality of radio antenna elements and a radio antenna control unit arranged for controlling operation of a plurality of radio resources provided by the AAS, the radio cell site equipment arranged for receiving, from a network control function, NWCF, deployed in the telecommunications system, at least one of instructions based on an upcoming demand for radio resources for serving aerial vehicle radio user equipments, UEs, covering a geographical area serviced by the radio cell site equipment, for operating the AAS for adapting the radio antenna arrangement for serving the aerial vehicle UEs, and instructions for reverting the adaptation of the radio antenna arrangement, the instruction from the NWCF to adapt the allocation of radio resources based on dynamically received changed priority or other decision criteria in terms of network settings, the priority always compared to the priority of and traffic capacity needs on the ground level for the terrestrial UEs.

\* \* \* \* \*